United States Patent
Vicars

(10) Patent No.: US 7,857,517 B1
(45) Date of Patent: Dec. 28, 2010

(54) CONNECTING ROD BEARING HOUSING

(76) Inventor: Berton L. Vicars, P.O. Box 2497, Ruidoso, NM (US) 88355

( * ) Notice: Subject to any disclaimer, the term of this patent is extended or adjusted under 35 U.S.C. 154(b) by 27 days.

(21) Appl. No.: 12/457,501

(22) Filed: Jun. 12, 2009

(51) Int. Cl.
*F16C 33/04* (2006.01)
(52) U.S. Cl. ............... 384/430; 384/294; 384/295; 384/434; 74/579 R
(58) Field of Classification Search ............ 384/288, 384/294, 295, 430, 432, 434; 74/579 R
See application file for complete search history.

(56) References Cited

U.S. PATENT DOCUMENTS

| | | | | | |
|---|---|---|---|---|---|
| 1,391,886 | A | * | 9/1921 | Fritz | 384/626 |
| 2,082,944 | A | * | 6/1937 | Evans | 384/294 |
| 2,560,413 | A | * | 7/1951 | Carlson | 384/434 |
| 3,682,018 | A | * | 8/1972 | Piech et al. | 74/579 E |
| 4,102,589 | A | * | 7/1978 | Haas et al. | 403/373 |
| 4,270,813 | A | * | 6/1981 | Wiggins | 384/431 |
| 4,716,638 | A | * | 1/1988 | Ampferer | 29/888.08 |
| 5,370,093 | A | * | 12/1994 | Hayes | 123/197.4 |
| 6,767,132 | B2 | | 7/2004 | Vicars | |
| 6,932,512 | B2 | * | 8/2005 | Cox et al. | 384/434 |

* cited by examiner

*Primary Examiner*—William C Joyce
(74) *Attorney, Agent, or Firm*—Stephen R. Greiner

(57) ABSTRACT

A connecting rod bearing housing includes an attaching portion and a retaining portion releasably joined together. The attaching portion and the retaining portion are each provided with a pair of alignment bores respectively located on opposite sides of the transverse passageway. The alignment bores are registered with one another and partially intersect the transverse passageway. An alignment washer is held within each pair of registered, alignment bores and projects into the transverse passageway. A sleeve-like bearing is positioned within the transverse passageway and has notches for snugly receiving the alignment washers. The washers prevent the rotation of the bearing within the housing.

5 Claims, 3 Drawing Sheets

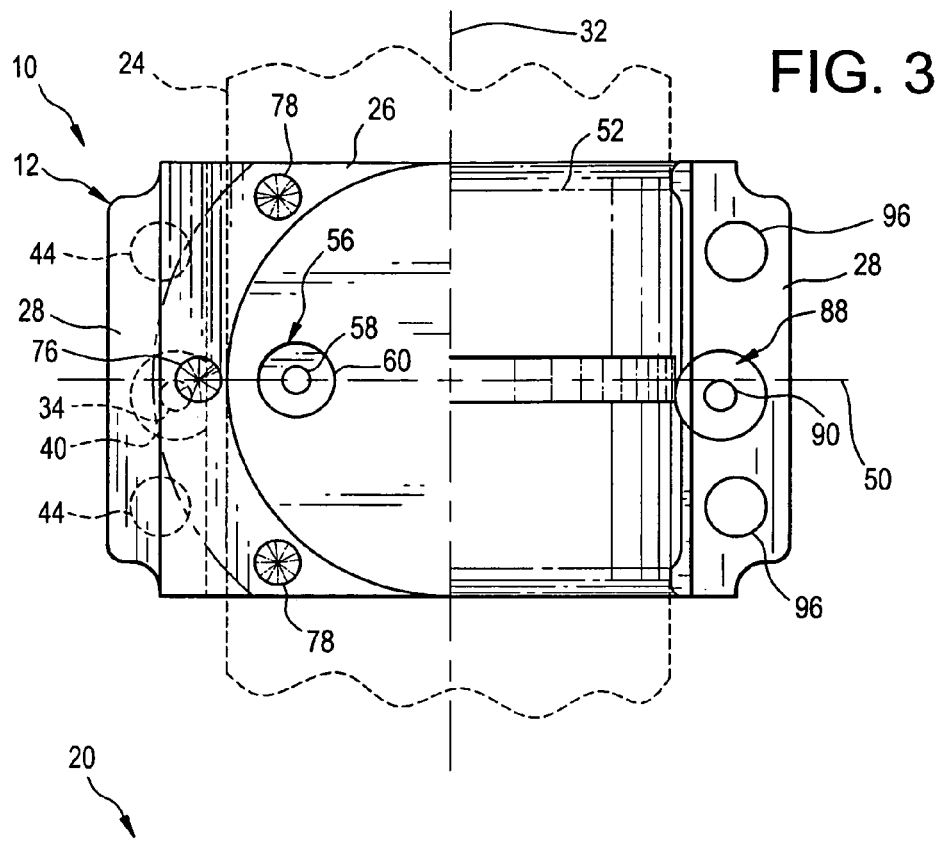
FIG. 3
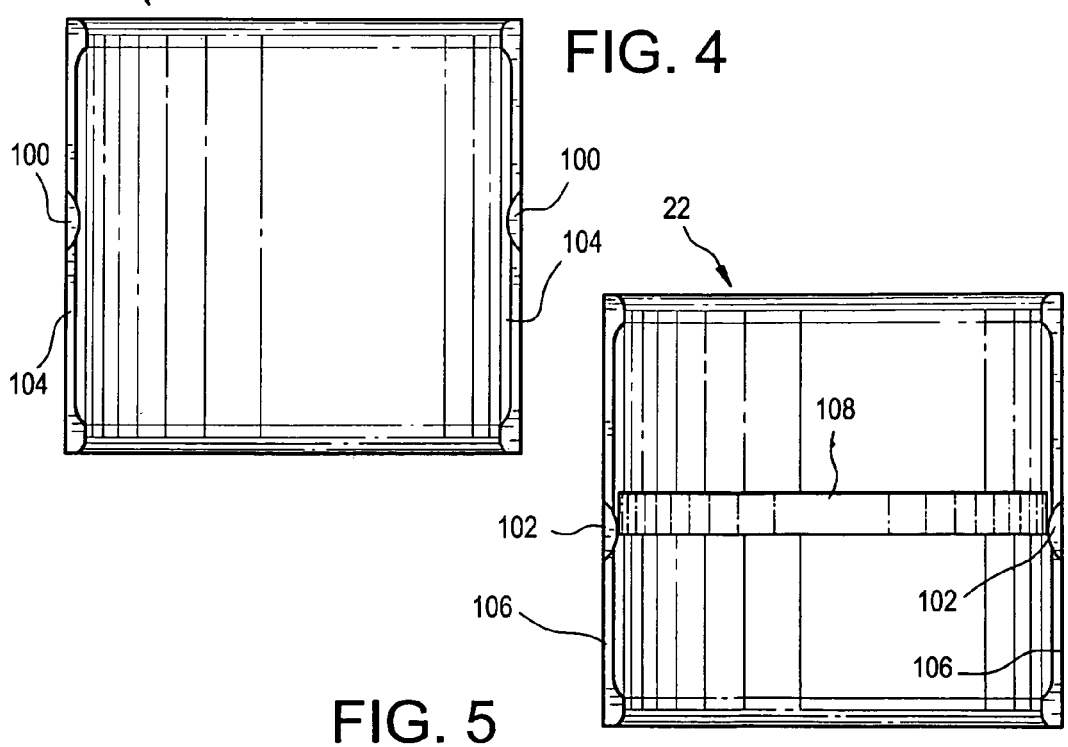
FIG. 4
FIG. 5

CONNECTING ROD BEARING HOUSING

FIELD OF THE INVENTION

The present invention relates to rotary bearings and, more particularly, to mountings or supports for rotary bearings on connecting rods.

BACKGROUND OF THE INVENTION

Hydraulic fracturing can increase the rate of production of oil and gas from low-permeability reservoirs. Hydraulic fracturing increases the permeability of reservoir rocks by opening channels through which oil and gas can move. During a hydraulic fracturing procedure, a fluid is pumped through a wellbore under high pressure into a subterranean reservoir where it splits or fractures the reservoir rock. A proppant, like sand, is often added to the pumped fluid and is carried in suspension into the newly formed fractures. When pumping ceases, the fractures partially close on the proppant, leaving channels for oil and gas to flow to a recovery well.

High-pressure pumps are used to complete hydraulic fracturing procedures or "frac jobs." These pumps have bearings that couple connecting rods to a crankshaft. These bearings usually incorporate bronze sleeves that encircle the crankshaft and prevent limit friction. Improper design of these sleeves, however, can restrict the flow of lubricant to the surfaces contacting the crankshaft. If flow is impeded, the sleeves and the pump can be damaged. Damage can be caused by the sleeves seizing upon the crankshaft so that they grind against their housings and by galling where they wear against the crankshaft. In either case, the affected pump must be immediately shut down and the bearings repaired. Such an event can be time consuming and costly for an oilfield operator conducting a frac job.

SUMMARY OF THE INVENTION

In light of the problems associated with the known connecting rod bearing housings, it is a principal object of mine to provide a new, bearing housing that provides excellent alignment of bearing sleeve surfaces to prevent uneven bearing wear and damage by friction. Use of my new housing will minimize pump breakdowns due to bearing sleeve failure, prolong pump life, reduce costs, and optimize profits.

It is a further object of mine to provide a bearing housing of the type described with a simplified mechanism for preventing the bearing sleeves carried thereby from rotating under normal operating conditions. Thus, the outside of the bearing cannot be caused wear against the bearing housing so as to result in a premature bearing failure.

It is another object of the invention to provide a bearing housing that is self-aligning, easy to assemble, and quick to install on a connecting rod. Both assembly and installation can be accomplished with conventional tools and by workers with minimal training.

It is an object of the invention to provide improved features and arrangements thereof in a connecting rod bearing housing for the purposes described which is lightweight in construction, inexpensive to manufacture, and fully dependable in use.

The foregoing and other objects, features and advantages of my bearing housing will become readily apparent upon further review of the following detailed description of the preferred embodiment as illustrated in the accompanying drawings.

BRIEF DESCRIPTION OF THE DRAWINGS

My connecting rod bearing housing can be more readily described with reference to the accompanying drawings, in which:

FIG. 3 is a top view of the connecting rod bearing housing.

FIG. 4 is a bottom view of the upper bearing segment carried by my housing.

FIG. 5 is a top view of the lower bearing segment carried by my housing.

Similar reference characters denote corresponding features consistently throughout the accompanying drawings.

DETAILED DESCRIPTION OF MY CONNECTING ROD BEARING HOUSING

Figure 1:
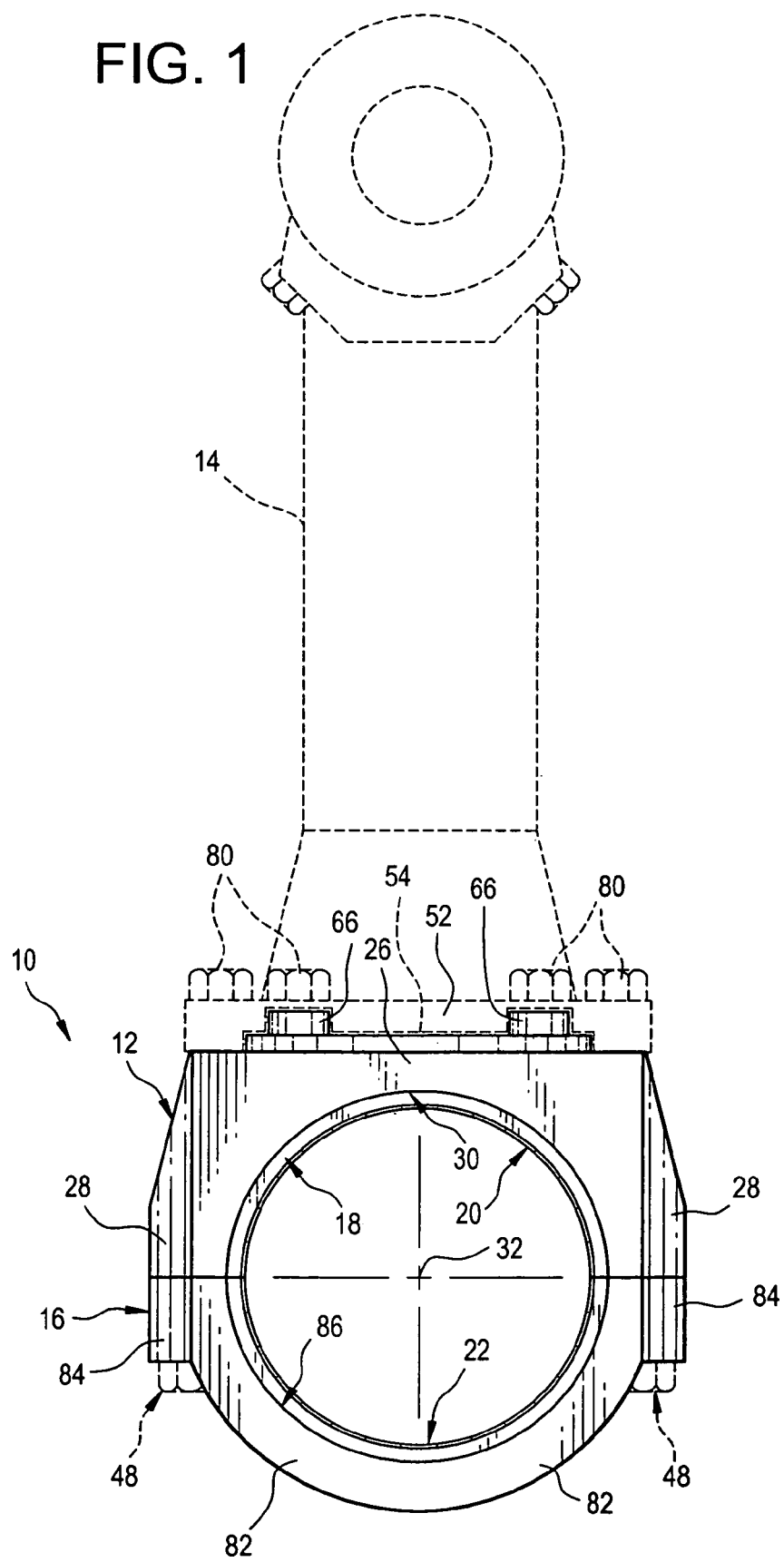
FIG. 1 is a side elevational view of my connecting rod bearing housing mounted on a connecting rod and carrying a connecting rod bearing.
Figure 2:
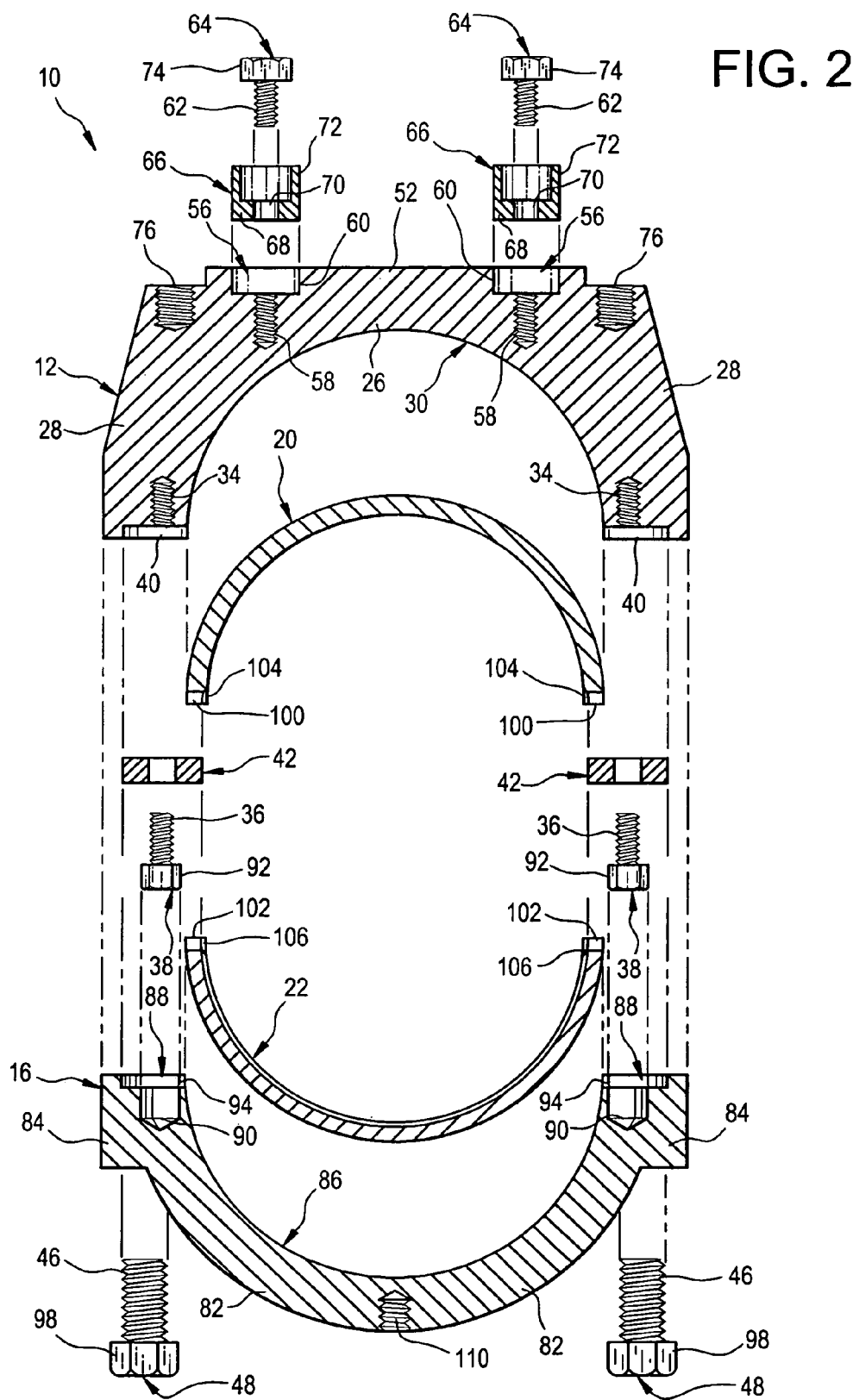
FIG. 2 is an exploded, cross-sectional view of my housing and rod bearing of FIG. 1.

Referring now to the FIGS., a connecting rod bearing housing in accordance with the present invention is shown at 10. Housing 10 includes an attaching portion 12 for fastening to the bottom of a connecting rod 14. Housing 10 also has a retaining portion 16 that is fastened to attaching portion 12 to form a ring-like assembly sized to accept a bearing 18. Bearing 18 has an upper segment 20 that is carried within attaching portion 12 and a lower segment 22 that is carried within retaining portion 16. In use, a crankshaft 24, of a high-pressure pump passed through segments 20 and 22, freely rotates within housing 10.

Attaching portion 12 resembles an inverted "U" when viewed from the front. In this regard, attaching portion 12 has a top plate 26 and a pair of downwardly extending arms 28 that are affixed to the opposite sides of top plate 26. Together, plate 26 and arms 28 are configured to define a cylindrical concavity 30 in the bottom of attaching portion 12 for snugly, yet releasably, receiving upper segment 20 of bearing 18. Cylindrical concavity 30 has a central, longitudinal axis 32.

An upwardly extending, alignment bore 34 is provided in the bottom of each of arms 28. Each bore 34 is helically threaded to accept the threaded shaft 36 of a bolt 38. Each bore 34 includes a lower, countersunk part 40 of increased diameter at its bottom end within which an alignment washer 42 positioned on threaded shaft 36 is set. Each bore 34 is located in an arm 28 so that countersunk part 40 intersects a side of concavity 30. Thus, when positioned in countersunk part 40, a washer 42 with a sufficient height and diameter projects downwardly from the bottom of an arm 28 and inwardly into concavity 30.

A pair of upwardly extending, attachment bores 44 is provided in the bottom of each of arms 28. As shown, one of bores 44 is positioned in front of alignment bore 34 and the other of bores 44 is positioned to the rear of alignment bore 34. Each of bores 44 is helically threaded to accept the threaded shaft 46 of a bolt 48 for the releasable fastening of retaining portion 16 to attaching portion 12 as will be described more fully below. With the centers of alignment bores 34 positioned the same small distance in front of a lateral axis 50, oriented at right angles to axis 32 midway between the front and back of attaching portion 12, it can be seen that attachment bores 44 in each arm 28 are positioned on opposite sides of bore 34, equidistantly from axis 50.

To keep attachment portion 12 centered on connecting rod 14, an alignment plug 52 extends upwardly from the top of top plate 26. Alignment plug 52 is integrally formed with top plate 26 for strength. Plug 52 is cylindrical in form so as to fit snugly into a close-fitting socket 54 of circular outline in the bottom of connecting rod 14.

A pair of downwardly extending, alignment bores 56 is provided in the top of attachment portion 12. Bores 56 are aligned with respect to axes 32 and 50. As shown, bores 56 are positioned on a plane that extends vertically upward through axis 50. When viewed from above, bores 56 are also seen to be equidistantly spaced from axis 32 for balance.

Bores 56 penetrate plug 52 to pass into top plate 26. Each of bores 56 has a lower, helically threaded part 58 for accepting the threaded shaft of a bolt 64. Also, each of bores 56 includes an upper, countersunk part 60 of increased diameter for receiving an alignment pin 66.

Each of a pair of alignment pins 66 includes a disk 68 sized for positioning within a countersunk part 60. Disk 68 has a central opening 70 sized for the passage of a threaded shaft 62. Projecting upwardly from the periphery of disk 68 is a cylindrical, side wall 72 having a height sufficient to project from countersunk part 60 when disk 68 is fully inserted therein. The inner diameter of side wall 72 is sufficient to receive the enlarged head 74 of a bolt 64 therein. So, when bolt 64 is tightened, head 74 presses downwardly on the top of disk 68, fastening alignment pin 66 to top plate 26.

Top plate 26 is provided with a number of downwardly extending, helically threaded bores 76 and 78 positioned around plug 52 through which bolts 80 are passed downwardly to attach bearing housing 10 to connecting rod 14. As shown, three bores 76 and 80 are positioned on opposite sides of axis 32. The central bores 76 are centered on a vertical plane extending through axis 50. The lateral bores 78 are positioned equidistantly from axis 50.

Retaining portion 16 resembles the letter "U" when viewed from the front. Retaining portion 16 has a pair of arms 82 that are affixed together at a location that serves as the bottom of housing 10. Arms 82 extend upwardly and outwardly from their junction with one another and terminate at top ends that are reinforced by outwardly extending flanges 84. Arms 82, together, define an upwardly opening, cylindrical concavity 86 in the top of retaining portion 16. Concavity 86 has the same radius of curvature as concavity 30 in attaching portion 12 and is similarly aligned with axis 32. Lower segment 22 of bearing 18 is fitted into concavity 86.

A downwardly extending, alignment bore 88 is provided in the top of each of arms 82 and is adapted for registration with a respective one of alignment bores 34 in attaching portion 12 when attaching portion 12 and retaining portion 16 are mated together. The bottom part 90 of each bore 88 is sized to accept the enlarged head 92 of a bolt 38. Additionally, each bore 88 includes a top, countersunk part 94 within which the bottom portion of an alignment washer 42 held by bolt 38 onto attaching portion 12 is snugly set. Each bore 88 is located in an arm 82 so that countersunk part 94 intersects a side of concavity 86. When positioned in countersunk part 94, a washer 42 of sufficient size projects inwardly into concavity 86.

A pair of upwardly extending, attachment bores 96 is provided in the top of each of arms 82 for registration with bores 44 in attaching portion 12. One of bores 96 is positioned forward of alignment bore 88 and the other of bores 96 is positioned rearward of alignment bore 88. Each of bores 96 is sized to accept the threaded shaft 46 of a bolt 48 passed upwardly through retaining portion 16. The bores 96 in each arm 82 are positioned on opposite sides of bore 88, equidistantly from axis 50. The enlarged heads 98 of bolts 48 engage the bottoms of flanges 84 when bolts 48 fasten attaching portion 12 and retaining portion 16 together.

Bearing 18 is assembled from upper segment 20 and lower segment 22, each resembling one-half of a tube cut lengthwise. Each of the opposed, free ends of segment 20 is provided with a circular notch 100 that engages a washer 42 projecting into concavity 30. Also, each of the opposed, free ends of segment 22 is provided with a circular notch 102 that engages a washer 42 projecting into concavity 86. Each washer 42, therefore, serves as a stop to prevent the rotation of upper segment 20 and lower segment 22 within housing 10.

Bearing 18 has features to distribute a liquid lubricant. Each of the opposed, free ends of upper segment 20 are provided with a beveled area 104 adjacent notch 100. Additionally, each of the opposed, free ends of lower segment 22 are provided with a beveled area 106 adjacent notch 102. When positioned side-by-side, beveled areas 104 and 106 form a lubricant reservoir extending from the front to the back of bearing 18. A channel 108 extends circumferentially around lower segment 22 to connect both beveled areas 106 together. Channel 108 provides a lubricant distribution pathway and ensures that the lubricant reservoirs formed from beveled areas 104 and 106 always contain similar quantities of lubricant under similar pressures.

Bearing housing 10 is attached to connecting rod 14 and installed in a pump with conventional tools. When the pump is running, bearing 18 is supplied with pressurized lubricating oil via passageways within the crankshaft 24 encircled by bearing 18. This oil fills channel 108 which distributes the oil to the reservoirs formed between beveled areas 104 and 106. In this way, large volumes of oil are kept between the crankshaft 24 and bearing 18 tending to: minimize the frictional forces acting upon bearing 18, keep operating temperature of bearing 18 low, and prolong the operating life of bearing 18.

Bearing 18 is easily removed from housing 10 for inspection or replacement if it is thought to become worn during use in a pump. To do this, attaching portion 12 is disconnected from retaining portion 16 by first unscrewing bolts 48. (An upwardly extending, helically threaded bore 110 permits a user to gain a mechanical lock on retaining portion 16 while bolts 48 are removed.) Then, retaining portion 16 is pulled away from attaching portion 12. With lower segment 22 being free of the crankshaft 24, it can be withdrawn from retaining portion 16 with the application of a light pulling force. Now, by rotating the crankshaft 24 somewhat, upper segment 20 can be pulled free of crankshaft 24 and inspected or replaced as needed. Installing a new bearing 18 is done by reversing the steps performed for bearing 18 removal. Inspection and replacement of bearing 18 can be accomplished quickly under optimal circumstances.

While bearing housing 10 has been described in great detail, it will be appreciated by individuals having knowledge of rotary bearings that modifications can be made to housing 10. Therefore, it must be understood that my invention is not limited solely to housing 10, but encompasses any, and all, bearing housings within the scope of the following claims.

I claim:

1. A connecting rod bearing housing, comprising:
   an attaching portion including:
   a top plate with opposite sides; and,
   a pair of first arms, each being affixed to a respective one of said opposite sides of said top plate and extending downwardly from said top plate wherein said top plate and said first arms define a first cylindrical concavity in the bottom of said attaching portion, and the bottom of each of said first arms are provided with an upwardly extending alignment bore, each said upwardly extending alignment bore having a first upper part that is helically threaded and a first lower part having a diameter that is greater than that of said first upper part, and said first lower part intersecting said first cylindrical concavity;

a retaining portion being releasably fastened to said attaching portion, said retaining portion including a pair of second arms being affixed to one another, said second arms extending upwardly and outwardly from one another, and said second arms defining a second cylindrical concavity in the top of said retaining portion, and the top of each of said second arms being provided with a downwardly extending alignment bore positioned for registration with a respective one said upwardly extending alignment bore in said attaching portion, each said downwardly extending alignment bore having a second lower part and a second upper part having a diameter that is greater than that of said second lower part, and said second upper part intersecting said second cylindrical concavity;

a pair of alignment washers, each of said alignment washers being snugly, yet releasably positioned in said first lower part of a respective one of said upwardly extending alignment bores and said second upper part of a respective one of said downwardly extending alignment bores; and, a pair of first threaded fasteners, each of said first threaded fasteners having a threaded shaft passing through one said alignment washer and being screwed into said first upper part of a respective one of said upwardly extending alignment bores, and each of said first threaded fasteners also having an enlarged head being affixed to said threaded shaft and positioned in said second lower part of a respective one of said downwardly extending alignment bores.

2. The connecting rod bearing housing according to claim 1 further comprising an alignment plug being affixed to said top plate and extending upwardly therefrom for insertion into a connecting rod.

3. The connecting rod bearing housing according to claim 2 further comprising a pair of alignment pins being affixed to said alignment plug and extending upwardly therefrom for insertion into a connecting rod so as to prevent misalignment between said connecting rod bearing housing relative to the connecting rod.

4. The connecting rod bearing housing according to claim 3 wherein each of said alignment pins includes:
   a disk with a central opening;
   a cylindrical, side wall being affixed to, and extending upwardly from, the periphery of said disk; and,
   a second threaded fastener for affixing said disk to said alignment plug.

5. The connecting rod bearing housing according to claim 4 wherein said alignment plug is provided with a pair of downwardly extending alignment apertures into each of which said disk of one of said alignment pins is fitted and said second threaded fastener is screwed.

* * * * *